Patented July 18, 1933

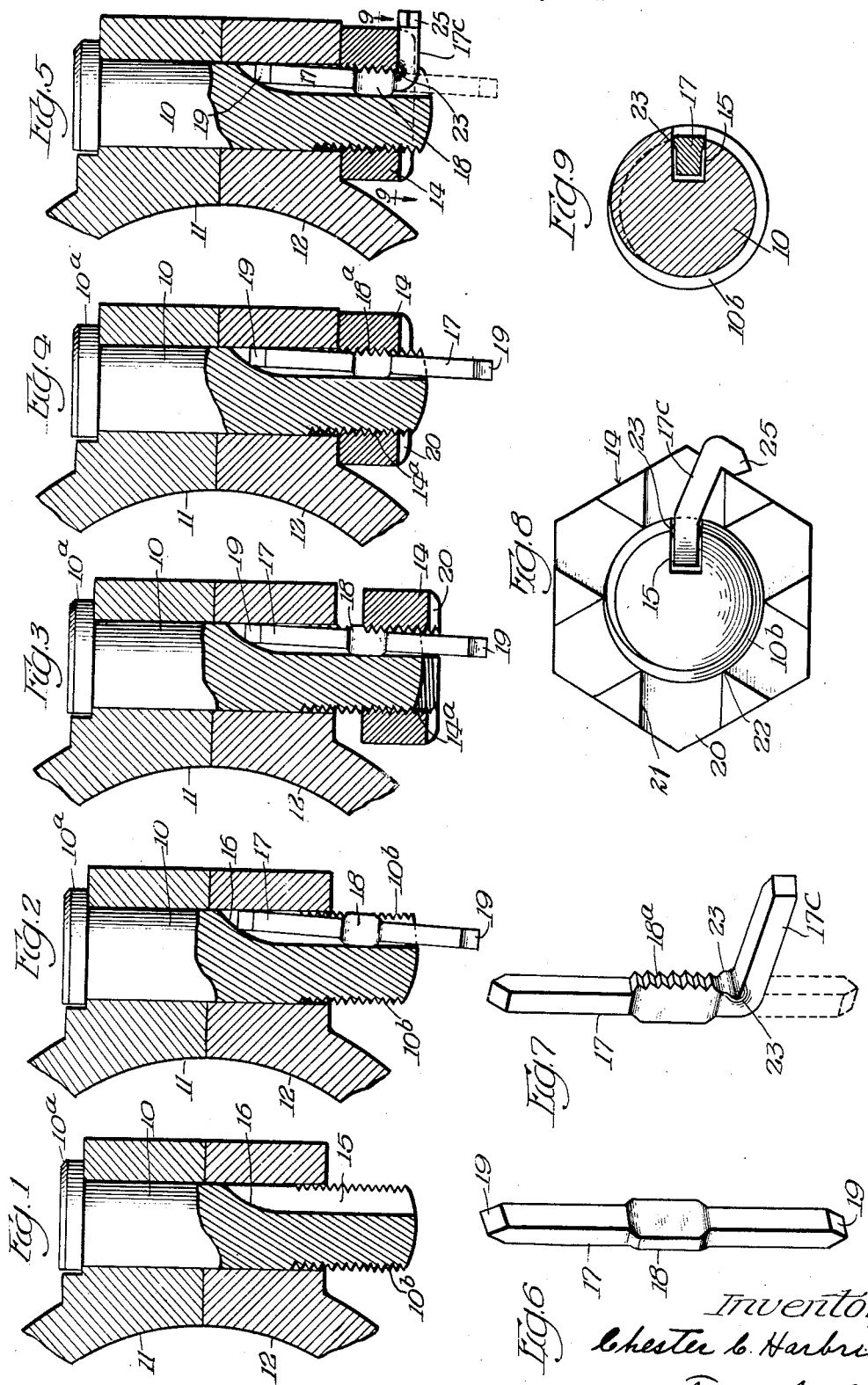

1,918,263

UNITED STATES PATENT OFFICE

CHESTER C. HARBRIDGE, OF DETROIT, MICHIGAN

NUT LOCK

Application filed March 7, 1932. Serial No. 597,145.

The invention relates to devices for locking nuts on bolts.

One object of the invention is to provide an improved pin for locking a nut on a bolt which is efficient in operation to prevent rotation of the nut on the bolt.

Another object of the invention is to provide a simple and efficient device which can be produced at a low cost for securing nuts on bolts.

The invention consists in the several novel features hereinafter set forth and more particularly defined by claims at the conclusion hereof.

In the drawing: Fig. 1 is a section illustrating the bolt before the locking pin and nut have been applied thereto. Fig. 2 is a section illustrating the locking pin inserted in the bolt, preparatory to receiving the nut. Fig. 3 is a section illustrating the nut as it is being turned on the bolt. Fig. 4 is a section illustrating the device after the nut has been turned into its securing position. Fig. 5 is a section illustrating the device after the pin has been bent to secure the nut against rotation on the bolt. Fig. 6 is a detail perspective of the locking pin. Fig. 7 is a perspective of the locking pin after it has been cross-grooved by the nut. Fig. 8 is an end view of the bolt and nut secured against relative rotation by the locking pin. Fig. 9 is a section taken on line 9—9 of Fig. 5.

The invention is exemplified as applied to a bolt 10 which extends through holes in the members 11 and 12 of a pitman for the purpose of removably securing these members together. One end of the bolt has a head $10^a$ and its other end has a male screw-thread $10^b$. A nut 14 has a female screw thread $14^a$ formed to engage the thread on the nut. The bolt has a longitudinal groove 15 in its periphery which extends inwardly from its threaded end and beyond the inner end of said thread, intersects the screw-thread $10^b$, and terminates in a curved shoulder 16 within the member 12. This groove 15 is rectangular in cross section and preferably is of a width which is slightly less than its depth. The improved locking pin 17 is formed of a strip of bendable wire which is rectangular in section, conforming substantially to the cross sectional area of the groove 15 with the necessary tolerance. This pin is adapted to enter the groove 15 and to conform and interlock between the bolt and the nut. The locking pin has a central portion 18 formed by pressing the metal of the wire. This portion 18 is of sufficient depth so that its outer edge will project into the grooves of the screw-thread $10^b$ on the bolt, so that the thread in the nut, when the nut is screwed onto the bolt, will cut cross grooves $18^a$ in the projecting edge portion of the expanded portion 18 of the pin. The unexpanded or end portions of the pin are of such depth that they will lie within the groove 15 without projecting substantially into the grooves of the screw-thread $10^b$ which lie between the expanded portion of the pin and the outer end of the bolt. This makes it possible to start the nut 14 on the bolt before the nut reaches the expanded portion 18 so that the nut will have sufficient threaded engagement with the bolt to cause the nut to cut the cross grooves in the expanded portion 18 of the pin 17. Each end of the pin is tapered or pointed, as at 19, to facilitate the entry of the pin into the groove 15. The expanded portion 18 of the pin is disposed in the longitudinal center of the pin to render the pin reversible; that is, so that either end can be inserted into the groove and when inserted the expanded portion 18 will be positioned outside of element 12 and inwardly of the outer end of the bolt. The groove 15 is preferably made so its radial dimension is greater than its cross dimension.

The cross section of the pin is correspondingly dimensioned to make it impossible to misplace the pin in the groove. If attempt is made to insert the pin 17 with the expanded portion 18 extending circumferentially in or across the groove 15, the pin will not enter the groove, because the width of the groove is insufficient to so receive the pin. Furthermore, if the expanded portion could be inserted to lie crosswise of the groove, its outer edge would not project into the grooves of the screw-thread $10^b$. The groove at the inner end of groove 15 forms, together with the side of the hole in the member 12, a tapered formation into which one end of the pin may be pressed or driven with sufficient force to cause the pin to be retained in the bolt before the nut is applied to the bolt.

The nut is provided on its outer face with radial grooves 20, into which the outer end of the pin 17 is adapted to be bent or hammered, as at 17°, to lock the nut against rotation on the bolt. These grooves are formed with walls 21 between them which terminate at their inner ends in points 22, so that the locking pin will clear the walls and be bendable into one of the grooves in practically any position. By forming points on these ends of the walls, the pin will be bendable into a notch whenever it will clear the divergent sides of the walls. This provides the maximum area of clearance for the bending of the pin, so that at most a very short turn, sufficient to cause the pin to clear the point of the wall, will be sufficient to permit the bending of the pin for locking the nut.

In use, the locking pin is inserted into the groove 15 in the bolt, as shown in Fig. 2. The pin may be wedged between the curved shoulder 16 at the inner end of the groove and the member 12 with sufficient force to hold the pin against displacement before the nut is applied to the bolt. The pin is reversible, so that either of its ends may be inserted into the bolt. The points 19 on the ends of the locking pin facilitate the entry of the pin into the groove 15. The pins are of necessity inserted in the groove so the expanded portion 18 will extend radially, because the groove 15 is dimensioned to prevent the pin from being misplaced in the groove. While the locking pin is held in groove 15, its expanded portion 18 will be disposed outside of the member 12 and inwardly of the end of the bolt, so that a number of the screw-threads nearest the outer end of the bolt will be free to receive the screw-thread of the nut before the nut encounters the portion 18 of the pin. The first few turns of the nut will draw it inwardly and thereafter the female thread on the nut will cut cross-grooves 18ª in the portion 18 of the pin which projects radially outward from the thread on the bolt, as shown in Fig. 3. When the nut has been turned to seat on the member 12, as shown in Fig. 4, the nut and pin will be interlocked against relative longitudinal movement by the threaded engagement between the pin and the nut, and the pin will be held in the bolt by the nut. The pin will be wedged upwardly in the groove when the nut encounters portion 18 of the pin, and this will prevent any longitudinal play of the pin. Next, the projecting end of the pin will be bent laterally, as at 17°, by a bolt from a hammer or tool into one of the grooves 20 so the nut will be effectively locked against rotation on the bolt by the pin which is locked by the groove 15. In practice, it is necessary to leave a slight tolerance of say several thousandths of an inch between the groove 15 and the pin, and it is desirable to take up this tolerance to prevent vibration of the pin in groove 15 of the bolt. When the pin is bent into one of the grooves 20, the metal at the inner corner of the bend is expanded, as at 23, and this causes the pin to fill the width of the groove and prevents the slight rotation of the nut which would be permitted by any circumferential play of the locking pin in the groove 15 in the bolt. The end of the pin is finally clinched, as at 25, around the outer end of one of the walls 21 of the nut, as shown in Figs. 5 and 8.

The invention exemplifies a locking pin for insertion between a bolt and nut which is simple in construction and can be produced at a low cost. The device has been found to be efficient and practical, and its low cost adapts it for general use.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. A lock-pin for nuts consisting of a strip of bendable metal of a size to lie within a longitudinal groove which intersects a screw-thread on a bolt, having an enlarged central portion adapted to project out of the groove, so that it will be cross-grooved by a nut applied to the bolt to interfit with the thread on the nut, the strip having both of its end-portions of reduced size, so they may be reversibly placed in the bolt.

2. The combination with a bolt having a screw-thread and a longitudinal substantially rectangular groove intersecting the thread with a shoulder at its inner end and a nut having a corresponding thread and its outer end notched, of a rectangular locking-pin adapted to lie in the groove with one of its ends against the shoulder, having a central portion projecting from the plane of one of its edges and positioned to be cross-grooved to interfit with the thread of the nut when the latter is applied to the bolt, and its outer end bendable into the notch in the nut.

3. The combination with a bolt having a screw-thread and a rectangular longitudinal groove intersecting the thread with an inclined shoulder at its inner end, and a nut having a corresponding thread and its outer end notched, of a rectangular locking pin having either of its ends adapted to lie in the groove and against the shoulder, said pin having its central portion projecting from the planes of the opposite edges of the strip and positioned to be cross-grooved to interfit with the thread of the nut when the latter is applied to the bolt, and having both of its ends tapered and either end bendable into the notch in the nut.

4. A lock pin for nuts consisting of a strip of bendable metal of a size to lie within a longitudinal groove which intersects a screw-thread on a bolt, said strip having an extension along a portion of the length of the strip projecting beyond the plane of one of its edges and adapted to project out of the groove so it will be cross-grooved by a nut applied to the bolt.

5. A lock pin for nuts consisting of a strip of bendable metal of a size to lie within a longitudinal groove which intersects a screw-thread on a bolt, said strip having extensions along a portion of the length of the strip on and projecting beyond the planes of its opposite edges respectively so that one of said extensions will project out of the groove and will be cross grooved by a nut applied to the bolt.

6. A lock pin for nuts consisting of a strip of bendable metal of a size to lie within a longitudinal groove which intersects a screw thread on a bolt, having a portion of reduced thickness projecting beyond the plane of one of its edges and adapted to project out of the groove so it will be cross grooved by a nut applied to the bolt.

7. A lock pin for nuts consisting of a strip of bendable metal of a size to lie within a longitudinal groove which intersects a screw-thread on a bolt, having a pair of upset portions transversely across the pin, of reduced thickness and projecting from the planes of its edges respectively so that one upset portion will project out of the groove and will be cross-grooved by a nut applied to the bolt.

8. A lock pin for nuts consisting of a strip of bendable metal of a size to lie within a longitudinal groove which intersects a screw-thread on a bolt, said strip being upset transversely at its center so as to provide a pair of portions of reduced thickness and projecting from the planes of its edges respectively so that one upset portion will project out of the groove and be cross-grooved by a nut applied to the bolt, the pin being reversible end to end and reversible to bring either of the projecting portions into position to be cross-grooved.

CHESTER C. HARBRIDGE.